UNITED STATES PATENT OFFICE.

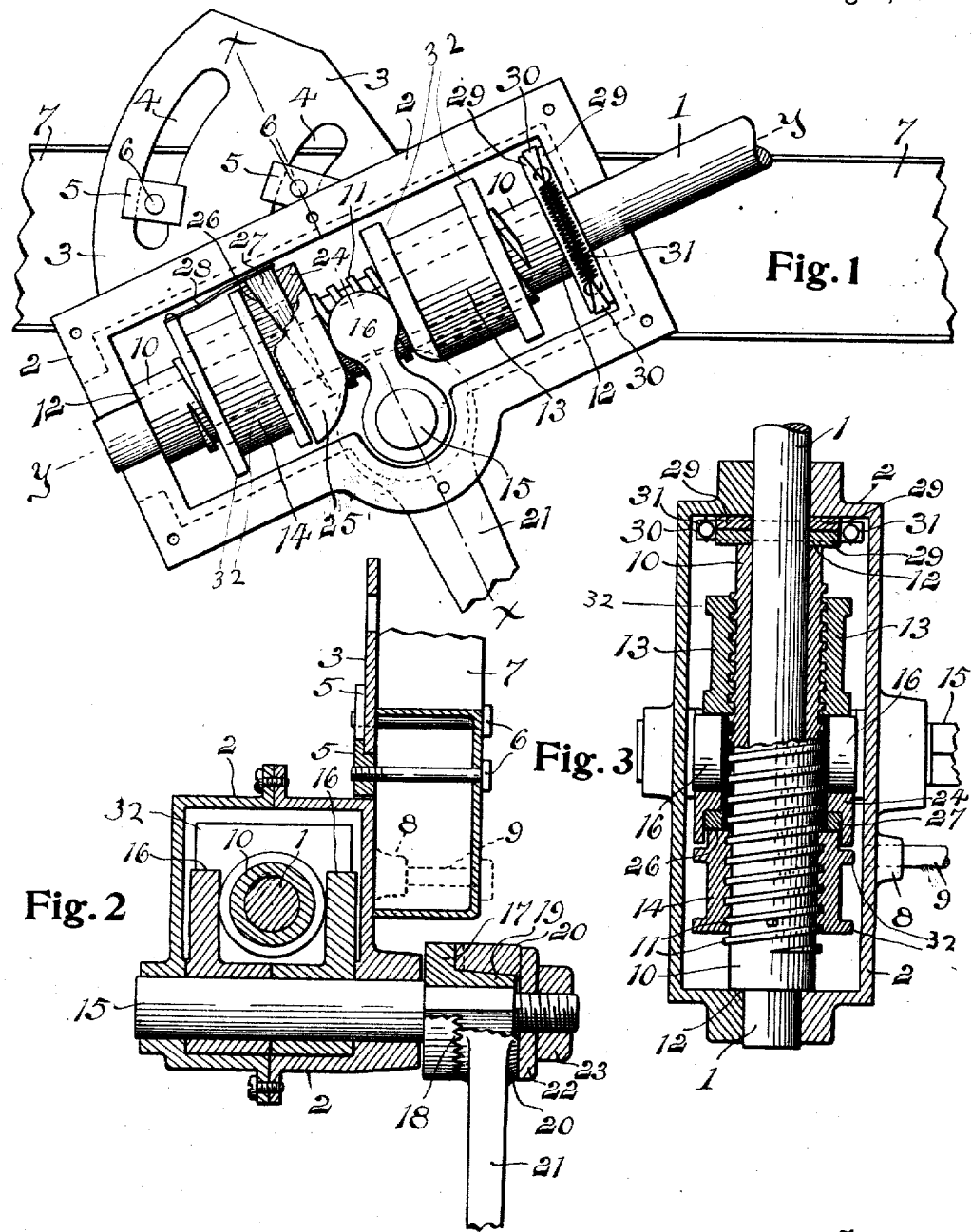

THEOPHILUS MAYHEW, OF DETROIT, MICHIGAN, ASSIGNOR TO AMERICAN PROMOTING COMPANY, OF DETROIT, MICHIGAN, A CORPORATION OF ARIZONA TERRITORY.

STEERING-GEAR.

999,823.  Specification of Letters Patent.  Patented Aug. 8, 1911.

Application filed April 12, 1910. Serial No. 555,018.

*To all whom it may concern:*

Be it known that I, THEOPHILUS MAYHEW, a citizen of the United States of America, residing at Detroit, in the county of Wayne and State of Michigan, have invented certain new and useful Improvements in Steering-Gear, of which the following is a specification, reference being had therein to the accompanying drawings.

This invention relates to steering gears for automobiles or other self-propelled vehicles and more particularly to certain details of construction, arrangement and combination of parts all as hereinafter more fully described and particularly pointed out in the claims reference being had to the accompanying drawing, in which—

Figure 1 is a side elevation embodying the invention with one side of the casing removed and parts broken away to show the construction; Fig. 2 is a transverse section of the same on the line $x$—$x$ of Fig. 1; and Fig. 3 is a longitudinal section on the line $y$—$y$ of Fig. 1.

In the drawings 1 indicates the lower end of a steering shaft rotatably mounted in a suitable casing 2 which is made in halves to facilitate the assembling. This casing is preferably provided at one side with an integral flange 3 having curved slots 4 therein to receive flanged nuts 5 slidable therein and engaged by bolts 6 for adjustably securing the flange and casing to the channel bar 7 forming part of the vehicle frame or other suitable support for the casing. A boss 8 having a screwthreaded bore is also provided on the side of the casing in a position to be engaged by a bolt 9 for securing the casing to the channel bar. The casing is adapted to turn upon the bolt 9, the nuts 5 sliding within the slots 4 to adjust the casing to any desired angle. When so adjusted the bolts 6 and 9 may be tightened and the casing thus securely held in the desired position.

A sleeve 10 having external screw threads 11 of any desired pitch and type is secured in any suitable manner to the shaft 1 within the casing, or said shaft may be enlarged and the threads formed thereon, the annular faces or shoulders 12 formed by each end of the sleeve acting as thrust bearings to prevent longitudinal movement of the shaft in the casing. Nuts 13 and 14 engage the screwthreaded sleeve and are provided with flanges 32 or otherwise formed to prevent their rotation within the casing but free to slide longitudinally therein.

Mounted in suitable bearings in the lower side of the casing is a transverse shaft 15 having secured thereon arms 16 which extend upwardly at each side of the sleeve between the adjacent ends of the nuts 13 and 14. On a squared end of the shaft 15 is mounted a member 17 having notches forming teeth 18 in one face and also formed with a projecting tapered sleeve portion 19 adapted to be engaged by a head 20 of a steering arm 21 which head is provided with a similarly tapered bore to engage the sleeve 19 and with notches at one side forming teeth to interlock with the teeth 18. The outer end of the shaft 15 is reduced and screwthreaded to receive a washer 22 to engage the end of the head 20 and a nut 23 to force the washer into engagement with the head and crowd the head into locking engagement with the member 17. By loosening the nut 23 the steering arm may be easily adjusted to any desired position relative to the arms 16. Between the nut 14 and the adjacent side of the arms 16, a plate 24 is interposed, said plate being formed with side flanges 25, and the adjacent end of the nut 14 is formed with an inclined surface 26 adapted to be engaged by a wedge member 27 interposed between said surface and the face of the plate 24, the wedge and plate being forked to straddle the screw sleeve. A flat spring 28 is secured at one end to the upper side of the nut 14 and extends into engagement with the upper end of the wedge 27 to yieldingly force said wedge downward between the nut and plate and take up any lost motion caused by wear or otherwise between the nuts and the arms 16 and also to take up any lost motion which there may be between the nut 14 and the screw threads on the sleeve.

The lower end of the sleeve 10 has a bearing upon the lower end of the casing and between its upper end or shoulder 12 and the upper end of the casing are interposed two washers 29 having inwardly beveled opposing faces to receive a pair of opposed wedges 30, the projecting ends of which are coupled by a pair of springs 31 hooked into apertures in the wedges under tension between the same. These wedges automatically take up any end motion of the sleeve in the casing due to wear.

In operation, the wedges 27 and 30 automatically move in or out to take up slack between the parts and occasion a smooth constant yielding engagement between the parts which prevents lost motion and wear. The arrangement of the arms 16 on the shaft to which the steering arm 21 is secured, said arms projecting upward between the nuts and directly operated thereby, further tends to prevent lost motion between the steering shaft and steering wheels of the vehicle as there are no links or other pivotall connected parts to transmit motion from the nuts to the steering arm 21 and the arrangement of the wedge 27 further tends to prevent any such lost motion by constantly holding the surfaces engaging the arms in contact therewith.

Having thus fully described my invention what I claim is:—

1. In a device of the character described the combination of a casing, a screw shaft in said casing, means at one end of said casing for automatically maintaining a constant endwise pressure on the shaft in one direction, nuts on said shaft, a steering arm, an arm operatively connected to the steering arm and projecting between said nuts in engagement with one of the same, and means interposed between the other nut and said arm to automatically maintain an endwise pressure on said nuts in opposite directions, said interposed means being located at the side of said arm farthest from said means for maintaining endwise pressure on the shaft.

2. A device of the character described comprising a casing, a screw shaft in said casing, nuts on the shaft having non-rotative slidable engagement with the casing, one of said nuts being formed with a plane contact surface at its end, a steering arm, an operating arm operatively connected with the steering arm and having a head formed with curved contact surfaces extending between the nuts in engagement with the plane contact surface of said nut, a plate at the other side of the arm having a plane surface engaging said curved surface of said head, and means interposed between said plate and adjacent nut to automatically maintain endwise pressure on said nut and against said plate.

3. A device of the character described comprising a casing, a continuous screw shaft in said casing, opposed nuts on the shaft longitudinally spaced apart, an operating shaft mounted in bearings in the casing transversely of the screw shaft, arms on the operating shaft provided with heads having curved contact edges and extending between the nuts adjacent to the sides of the screw shaft, and means interposed between one of the nuts and said arms, having a plane contact surface to engage the edges of said arms and adapted to automatically maintain a constant endwise pressure on the nuts in opposite directions.

4. A device of the character described comprising a casing, a screw shaft in said casing, nuts on said shaft one of which is provided with an inclined face at its end opposing a plane contact face on the other nut, said nuts being longitudinally spaced apart, a shaft arranged transversely of the screw shaft in the casing, arms on said transverse shaft extending between the ends of the nuts and provided with curved contact edges, a wedge movable transversely of the shaft in contact with said inclined face of the nut, and a plate movable longitudinally of the shaft interposed between said wedge and arms and formed with a plane contact surface to engage said arms.

In testimony whereof I affix my signature in presence of two witnesses.

THEOPHILUS MAYHEW.

Witnesses:
JENNIE L. MOUNTAIN,
JONATHAN A. ZAHN.